April 23, 1940.  R. M. ISTED  2,198,036

CONVEYER FOR TILES AND THE LIKE

Filed June 3, 1938  2 Sheets-Sheet 1

REGINALD MILES ISTED INVENTOR

BY William C. Linton

ATTORNEY

April 23, 1940.                R. M. ISTED                2,198,036
                     CONVEYER FOR TILES AND THE LIKE
                     Filed June 3, 1938         2 Sheets-Sheet 2
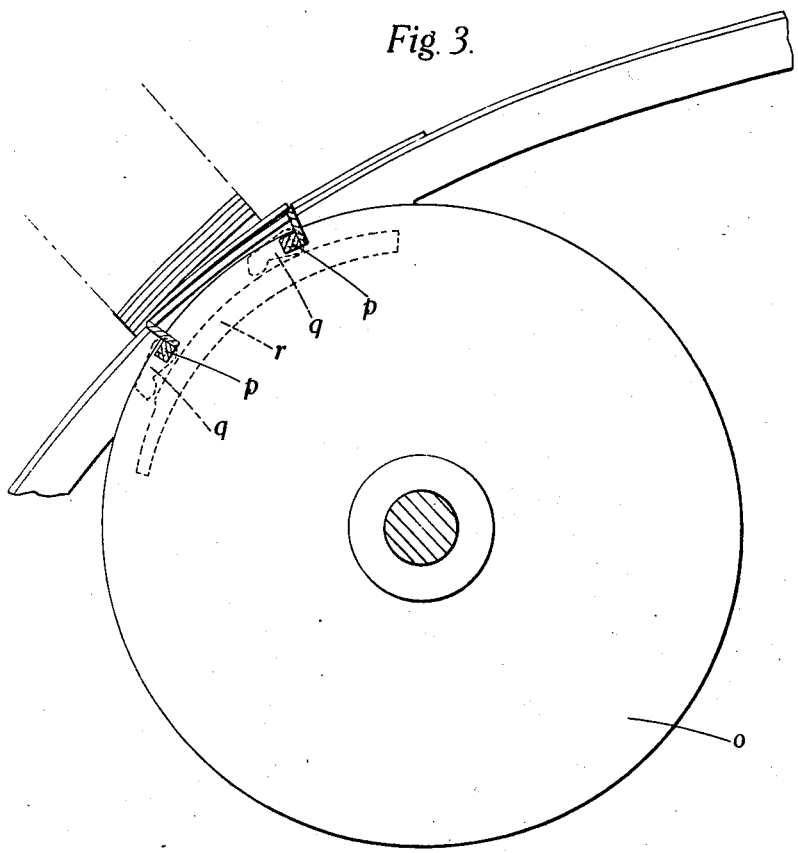
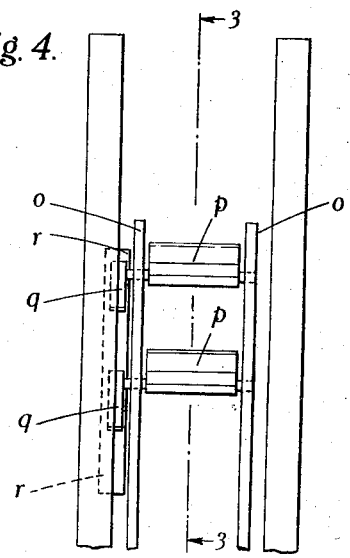
REGINALD MILES ISTED Patented Apr. 23, 1940

2,198,036

UNITED STATES PATENT OFFICE 2,198,036

CONVEYER FOR TILES AND THE LIKE

Reginald Miles Isted, Horsham, England

Application June 3, 1938, Serial No. 211,697
In Great Britain June 4, 1937

5 Claims. (Cl. 198—168)

This invention relates to pallet feeding mechanism for machines for making tiles, slabs and the like.

The invention further relates to pallet feeding mechanism of the type wherein a magazine is provided for the reception of a plurality of pallets and the pallets, one at a time, are taken from the magazine and pushed on to a track by means of projections or "pushers" mounted on a continuously running conveyer unit, to a hopper containing the plastic mass or aggregate which is deposited on the pallet. For the remainder of the travel through the machine the pallets are pushed along the said track by those pallets following behind.

There is a serious disadvantage with this type of machine, viz. the pallets are conveyed along the said track towards the hopper at intervals, that is to say, there is a momentary gap between the pallet leaving the magazine and the preceding pallet, and the action of the said pallet making contact with the stationary pallet immediately in front causes a jar or jolt which fractures the continuous layer of plastic mass on the taking off side of the hopper.

This jarring or jolting increases as the rate of travel of the pallets increases.

The object of this invention is to provide an improved construction of pallet feed mechanism whereby the said gap between the pallets on the track after leaving the magazine is eliminated.

To this end, a pallet feed mechanism is characterised in that means are provided whereby the speed of each pallet after it has dropped from the magazine and made contact with the pusher is accelerated for a period sufficient to place the pallet in contact with its predecessor which is still traversing the track, thereby closing up the gap and constituting a continuous feed at a uniform speed.

Accordingly, the pushers, which are disposed at equal predetermined distances along the conveyer unit and project therefrom to engage the rear edges of the pallets, are pivotally mounted on the said conveyer unit and are caused to ride along suitably shaped cam tracks in such a manner that the angular or pivotal movement thereof accelerates the speed of each pallet until it contacts with its predecessor.

Figure 1:
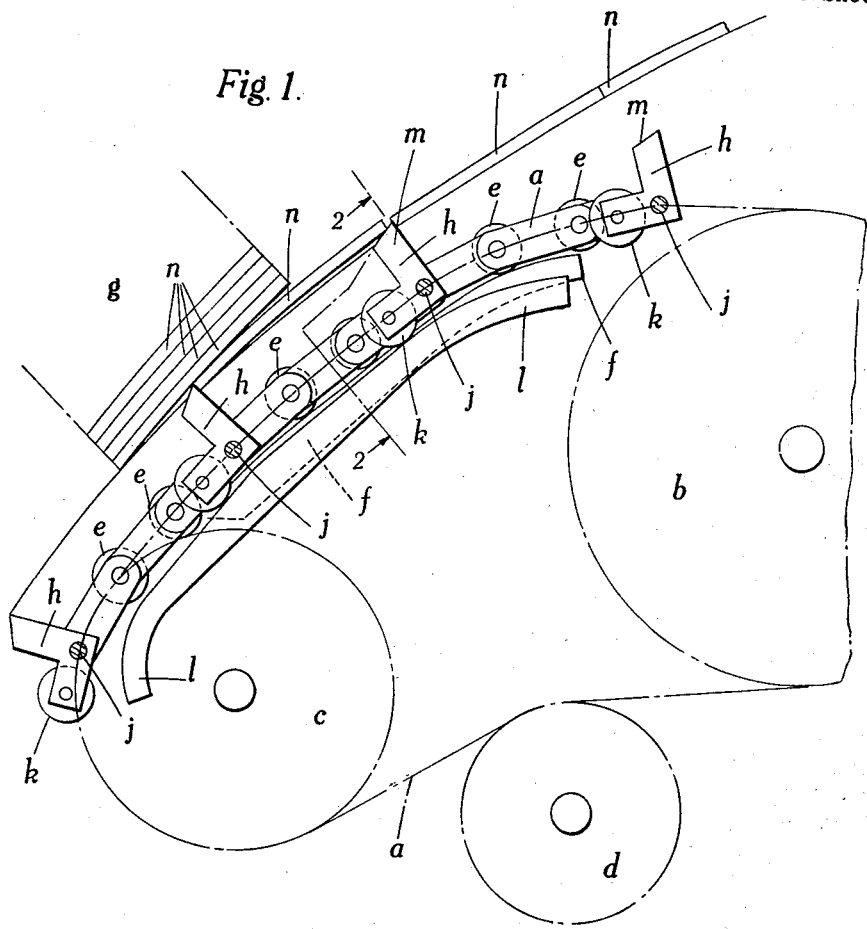
Figure 2:
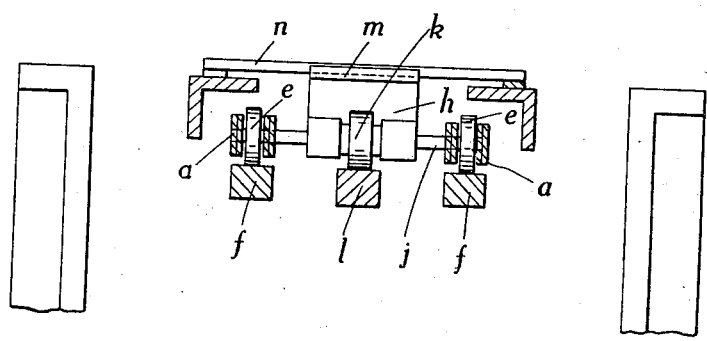

The invention will now be described with reference to the accompanying drawings in which Figure 1 is a side elevation shewn somewhat diagrammatically of one form of feed mechanism constructed in accordance with this invention, and Figure 2 is a section on the line 2—2 of Figure 1; Figure 3 is a section taken on the line 3—3 of Figure 4, shewing somewhat diagrammatically another form of feed mechanism, and Figure 4 is an end elevation looking in the direction of the arrow in Figure 3.

Referring first to Figures 1 and 2, the said conveyer unit may consist of a pair of spaced apart endless chains $a$, $a$, mounted on sprocket wheels $b$, $c$, of which $b$ is the driver and $c$ is the idler; $d$ is an adjustable jockey wheel. Between the said chains the pushers are disposed. Each chain is fitted with rollers $e$, $e$, $e$, which are adapted to bear on a suitably shaped cam track $f$ disposed underneath the pallet magazine $g$.

The pushers consist of ⌐-shaped members $h$, $h$, each mounted on a fulcrum pin $j$ between the chains $a$, $a$.

A small trailer wheel $k$ is carried by the horizontal limb of the ⌐-shaped member $h$ and is disposed at or near the extremity thereof. This trailer wheel is also adapted to bear on a suitably shaped cam track $l$ disposed underneath the said magazine $g$.

The upper extremity of the vertical limb of the pusher is preferably bevelled rearwardly as at $m$.

The said two cam tracks $f$ and $l$ are so shaped and arranged in relation to one another that when the chain rollers $e$ and trailer wheel $k$ bear on them, each pusher is caused to move about its fulcrum with the result that the extremity of the vertical limb travels faster than the chain for a short period.

Accordingly, when the pallets $n$, $n$, are placed in the magazine $g$ and the rear edge of the lowermost pallet is about to be engaged by the upper extremity of the vertical limb of the pusher, the front edge of the pallet is resting on the rear edge of the bevelled upper extremity of the pusher immediately in front. As the pallet is pushed along the track, the front edge of the pallet is caused to travel up the whole of the bevelled surface by the momentary acceleration of the pusher, thereby engaging the rear edge of the still moving pallets and taking up the pushing action, thus permitting the preceding pusher to recede and disengage itself from the train of pallets. In a similar manner the next lowermost pallet in the magazine is engaged by the following pusher and the action is repeated.

Referring now to Figures 3 and 4, the conveyer member consists of a pair of spaced apart discs or circular frames $o$, $o$, between which the pushers, which consist of ⌐-shaped bars $p$, $p$, are disposed. Each of said bars $p$ is pivotally mounted in the said discs or frames and has connected to it, at one end, an arm or lever $q$ adapted to engage and ride along a suitably shaped cam track $r$ disposed on a stationary part of the machine.

As the said arms $q$, $q$, contact with the said cam track $r$, the ⌐-shaped bars are moved about their pivots with the result that the upper extremities of the bars travel faster than the discs or frames.

The action of the pushers with the pallets as described above with reference to the construction illustrated in Figures 1 and 2 is the same in the construction described in Figures 3 and 4.

With machines constructed as above described, the speed of travel of the pallets through the machine can be increased very considerably without any injury whatever to the plastic masses on the pallets.

Further, with a machine constructed according to Figures 1 and 2, it is possible to vary the radius of the chain track to conform to the radius of the track which carries the particular type of pallet used. In this case where a flat pallet is used, the chain track would also be flat.

What I claim is:

1. A mechanism for feeding pallets from a stack thereof in a continuous line comprising a track, a series of motivated pushers each capable of sliding one of said pallets from said stack and along said track, means supporting, interconnecting and guiding said pushers longitudinally of said track, means for accelerating the motion of each of said pushers until the pallet being pushed thereby contacts a preceding pallet and means for causing the pusher of said preceding pallet to drop from contact therewith substantially at the time of the contacting of said pallets.

2. A mechanism for feeding pallets from a stack thereof in a continuous line comprising a track, a series of driven pushers each capable of withdrawing a pallet from said stack and sliding the same along said track for a given distance, means supporting, interconnecting and guiding said pushers longitudinally of said track, and a cam track motivating each of said pushers for accelerating the motion of the pallet pushed thereby until the preceding pallet is contacted by said accelerated pallet.

3. A mechanism for feeding pallets from a stack thereof in a continuous line comprising a track, a series of pushers capable of withdrawing a pallet from said stack and pushing it along said track, means motivating and pivotally supporting said pushers in spaced relationship to one another, each of said pushers having an arm connected thereto, a cam track being contacted by each of said arms for a given period for pivoting the pusher connected thereto in such a manner as to accelerate the motion of the pallet pushed thereby until the preceding pusher is contacted, each of said pushers having the rear face thereof tapered to permit an accelerated pallet to gradually ride thereup to contact the preceding pallet and said cam track being further shaped to gradually pivot and thereby withdraw a contacted pusher from its pallet.

4. A mechanism for feeding pallets from a stack thereof comprising a track having said stack of pallets mounted thereabove, a pair of spaced apart motivated endless chains passing beneath said track, a series of pushers pivotally carried by and between said pair of chains, a series of rollers connected to each of said chains, a pair of cam tracks each to be contacted by the rollers of each of said pairs of chains beneath said stack of pallets and a third cam track to be contacted by a portion of said pushers for pivoting said pushers.

5. A mechanism for feeding pallets from a stack thereof comprising a track having said stack of pallets mounted thereabove, a pair of spaced apart motivated discs rotatably mounted beneath said track, a series of pushers pivotally carried by and between said pair of discs, a series of levers each connected to one of said pushers, and a cam track to be contacted by an end of each of said levers for pivoting the pusher connected thereto.

REGINALD MILES ISTED.